Patented Sept. 7, 1937

2,092,332

UNITED STATES PATENT OFFICE 2,092,332

PRODUCTION OF MIXTURES OF BITUMINOUS SUBSTANCES WITH RUBBER

Johan Aart Plaizier, Overschie, and Jean Gérard Fol, The Hague, Netherlands, assignors to Internationale Vereeniging Voor De Rubber en Andere Cultures in Nederlandsch-Indie, The Hague, Netherlands No Drawing. Application December 17, 1934, Serial No. 757,938. In the Netherlands December 23, 1933

2 Claims. (Cl. 106—23)

Our invention relates to the production of mixtures of bituminous substances and more especially asphaltic bitumina or asphalt proper with finely subdivided rubber.

It is an object of our invention to provide means whereby such mixtures can be produced in a particularly simple and efficient manner.

As is well known to those skilled in the art, the properties of asphaltic bitumina and asphalt can be greatly improved by the admixture of rubber which may or may not be vulcanized.

In speaking of asphaltic bitumina and asphalt we intend to designate the following substances:

The term "asphaltic bitumina" is intended to include the compounds, containing carbon and hydrogen, dissolving in carbon disulfide and, on being incinerated, leave no ashes. These compounds are found in minerals, in materials obtained by the destructive distillation of crude oils or tar and the like and in products obtained from these compounds and materials.

The term "asphalt" is intended to include a semi-solid or solid mixture of bituminous substances, which contains little or no volatile constituents, is partly insoluble in normal benzine (petrol) and does not contain any admixtures other than those present in the raw material.

In admixing rubber with asphaltic bitumina or asphalt, one may proceed in different ways. It has for instance been suggested (see India Rubber Journal of December 3, 1932, page 770) to mix pulverulent rubber with asphalt, however no statement is found regarding the manner in which this mixture is effected. It has further been suggested to simply dissolve the rubber, which may or may not be vulcanized, in molten asphaltic bitumina or asphalt. In both cases great difficulties are encountered in the production of homogeneous mixtures and these difficulties can be overcome more or less successfully only by prolonged heating and very vigorous agitation, during which treatment the rubber is however frequently affected and decomposed, sometimes to the extent that the desired properties are not obtained and undesirable properties are acquired.

It has also been attempted to obtain a homogeneous mixture by first dissolving rubber in a solvent and adding this rubber solution to the asphaltic bitumina or asphalts, which had as a rule been fused so as to effect a homogeneous mixing of the constituents. This mode of proceeding is however accompanied by other disadvantages which will be discussed more in detail further below.

The solvents for rubber which are customarily used in the rubber industry, such as benzine (petrol) or benzol (benzene) are highly volatile and have a low flash point, so that the mixing of the rubber solutions containing these solvents with the hot molten asphalt bitumina or asphalts is connected with difficulties and with danger to the operators. During preparation as well as during the use of these mixtures these solvents will evaporate, which means a considerable loss of valuable material. A further drawback consists in the fact that the dissolving of raw rubber under the form of crepe, sheets, blocks, slabs, etc., proceeds only slowly so that it is desirable to first plastify the rubber and to vigorously stir it with the solvent. However even if proceeding in this manner one obtains solutions of high viscosity and which, even in the case of low concentration (for instance 5%) form a stiff gel or gelatinized mass, which cannot be poured so that it would be still more difficult to homogeneously mix it with the asphalt bitumina or the asphalts.

There exists the further difficulty that neither the asphaltic bitumina nor the asphalts are completely soluble in most of the customary solvents for rubber and this circumstance also contributes to rendering the production of a homogeneous mixture difficult if not altogether impossible.

We have now found that all these drawbacks can be obviated and a highly homogeneous mixture of rubber with asphaltic bitumina or asphalt containing a high percentage of rubber can be produced at less cost by suspending finely subdivided rubber in a liquid which is not a solvent for rubber or which dissolves it only very slowly. On the other hand this liquid must be readily miscible with the asphaltic bitumina or asphalt. The suspension containing the rubber in dispersion in the unswelled state is incorporated with the molten asphaltic bitumina or asphalts before assuming the character of a solution and is mixed therewith by stirring.

We prefer applying the rubber in the form of a powder such as obtained for instance as described in the specification of British Patent No. 316,006 by finely subdividing latex or latex concentrates, to which may be admixed other substances including fillers, vulcanization ingredients, protective colloids etc., and drying and evaporating the finely subdivided latex particles to dryness. The product obtained, as described in the British patent, is a dry, pulveriform, non-tacky, non-coherent and stable preparation, capable of being dispersed in water. We may however also use finely subdivided rubber obtained in a different manner, as described for instance in the specifications of British Patents 392,592, 395,775 and 396,880. Our process is not affected by the manner in which the pulverulent rubber product has been obtained, however the finer the subdivision, the quicker a homogeneous mixture is obtained.

As mentioned above, the liquid, in which this finely subdivided rubber is suspended, should not dissolve rubber or, if acting as a solvent, should do so only very slowly, so that within the period of time required for producing the final product no viscous gelatinized mass can form, it being important that, although the suspension may contain a high percentage of rubber, it will still remain thinly fluid. The preparation of the suspension and the mixing with asphaltic bitumina or asphalts require some time which depends upon the quantities to be mixed, the apparatus used, the temperature of operation etc. The rate at which the rubber may dissolve in the liquid must be so slow that the dispersion (which term includes a mere suspension and a molecular solution which might partly be formed therefrom) retains, during the mixing, the character of a suspension. In other words, it is important that at least during the period of preparation and admixture the suspension be readily miscible with the asphaltic bitumina or asphalts.

Obviously the only important requirement is the homogeneous distribution of a quantity of rubber, which may be large, in asphalt bitumina or asphalts in an easy manner. The behaviour of the rubber after the mixture has once been completed is of no decisive importance as far as our invention is concerned. We only wish to add that if the rubber should later on dissolve in the finished mixture, this would rather constitute an advantage and it is therefore advantageous to operate with a liquid which after a time acts somewhat after the manner of a solvent, provided only that this weak dissolving action does not become effective during the period of preparation of the mixture. This requirement clearly distinguishes our process from those hitherto used, according to which the rubber is purposely dissolved as completely as possible before being added to the asphalt bitumina or asphalts.

Amongst the liquids which, while dissolving rubber, are still miscible with asphaltic bitumina and asphalts, we may mention anthracene oil, creosote oil and heavy tar oil. Amongst the liquids which, while being miscible with the asphaltic bitumina and asphalts, dissolve rubber only very slowly, may be mentioned paraffine oil, heavy lubricating oil, turpentine oil and linseed-oil.

The best results were however obtained with the so-called fluxing agents, for instance the flux oils used in the asphalt industry. These liquids are known to be as a rule completely miscible with asphaltic bitumina or asphalts so that they result in an altogether stable mixture, which does not tend to separate in the course of time, as may be the case if non-homogeneous substances are mixed with each other. The comparatively high boiling point of these fluxing agents also renders them particularly suited for use as dispersing agents so that by simple agitation suspensions of finely subdivided rubber containing up to and above 20% rubber can be produced which are nevertheless thinly fluid and remain so during the time required for pouring and homogeneously distributing them in molten asphaltic bitumina or asphalts.

During storage these suspensions are converted into thickly fluid or viscous solutions and gelatinous masses and it is therefore advisable not to allow the dispersions to stand unnecessarily long before they are mixed with the molten asphalt bitumina or asphalts.

Instead of dispersing non-vulcanized rubber we may also use vulcanized rubber as obtained for instance by atomizing vulcanized latex or latex concentrates or a mixture thereof with vulcanizing ingredients. We may also effect vulcanization by adding to the dispersion liquid vulcanizing ingredients and heating to vulcanization temperature. We may also effect vulcanization of the mixture of rubber with asphaltic bitumina or asphalts and vulcanizing ingredients by heating to the proper temperature.

Although the fluxing agent alone acts on the bitumen in the direction of lowering the softening (melting) point and increasing the penetration, we may, by combining the fluxing agent with the rubber, simultaneously increase the penetration and raise the softening point. This is particularly useful if mixtures of this kind are employed in the construction of roads, as protective agents against corrosion, in the form of bituminous pigments, dyestuffs and lacquers, in the preparation of impregnated fabrics, insulating material, felt, paper, etc.

In the operation of our invention we may for instance proceed as follows:

*Example 1*

11.25 parts by weight commercial rubber powder, which may have been produced by spraying and drying non-vulcanized latex, are suspended by stirring in 50 parts heavy tar oil. To this suspension are added 100 parts fused asphalt bitumen and the mixture is well stirred. The resulting product contains 7.5 parts rubber per 100 parts of the mixture of asphaltic bitumen and tar oil.

*Example 2*

100 parts by weight commercial rubber powder are suspended by stirring in 100 parts flux oil. To this suspension are added under stirring 100 parts fused asphaltic bitumen. The resulting product contains about 5% rubber.

*Example 3*

10 parts by weight finely subdivided vulcanized rubber are suspended under stirring in 100 parts flux oil and this dispersion is introduced under stirring into 100 parts fused asphaltic bitumen until the rubber is homogeneously distributed in the asphalt.

*Example 4*

To non-vulcanized latex a paste is added containing, calculated on 100 parts by weight of the rubber contained in the latex, 10 parts water, 10 parts of a 5% solution of ammonium oleate in water, 6 parts sulphur, 5 parts zinc oxide and 1 part zinc pentamethylenedithiocarbamate. This mixture is sprayed or atomized and dried at 105° C. and the finely subdivided rubber thus produced is heated for vulcanization. 15 parts of the rubber powder thus obtained are suspended under stirring in 100 parts flux oil and this suspension is now added under stirring to 100 parts fused asphalt bitumen to produce a homogeneous mixture.

Example 5

To non-vulcanized latex is added a paste containing per 100 parts of the rubber contained in the latex 50 parts water, 60 parts of a 5% solution of ammonium oleate in water, 6 parts sulphur, 5 parts zinc oxide, 2 parts zinc pentamethylenedithiocarbamate and 50 parts china clay. This latex mixture is atomized at 105° C. and dried for vulcanization of the finely subdivided rubber. 15 parts of the rubber powder thus produced are suspended under stirring in 100 parts flux oil and the suspension thus formed is mixed under stirring with 100 parts fused asphalt bitumen. In a very short time the rubber is homogeneously distributed in the asphalt.

Example 6

To non-vulcanized latex is added a paste containing per 100 parts rubber in the latex 50 parts water, 20 parts hemoglobine, 6 parts sulphur, 5 parts zinc oxide and 1 part piperidinepentamethylenedithiocarbamate. This mixture is heated one hour to 90° C. and thereafter atomized and dried. 20 parts of the powdered rubber thus obtained are now suspended under stirring in 60 parts flux oil. The suspension thus formed is now introduced under stirring into 200 parts asphalt bitumen for homogeneous distribution.

Example 7

To non-vulcanized latex is added a paste containing per 100 parts rubber in the latex 50 parts water, 20 parts dextrine, 6 parts sulphur, 5 parts zinc oxide and 1 part hexamethylenetetramine. The latex mixture is now atomized and dried at 105° C., whereupon 10 parts of the rubber powder thus obtained are suspended under stirring in 100 parts flux oil. This suspension is now added under stirring to 100 parts fused asphalt bitumen. By heating the mixture thirty minutes to 147° C. the non-vulcanized finely divided rubber is vulcanized. Vulcanization may of course be effected at a higher or lower temperature, however in that case the heating period will be shorter or longer than thirty minutes.

Various changes may be made in the details disclosed in the foregoing specification without departing from the invention or sacrificing the advantages thereof.

In the claims affixed to this specification no selection of any particular modification of the invention is intended to the exclusion of other modifications thereof and the right to subsequently make claim in the present application to any modification not covered by these claims is expressly reserved.

We claim:—

1. In the manufacture of asphalt compositions containing vulcanized rubber uniformly dispersed therein, the method which comprises mixing rubber latex with a paste comprising water, dextrine, sulphur, zinc oxide and hexamethylenetetramine, spray-drying the mixture to form a rubber powder, dispersing said powder in a flux oil readily miscible with asphalt bitumen, but having not more than a slow solvent action on rubber, mixing the dispersion of rubber powder in the flux oil, so obtained, in a thinly fluid condition, with fused asphalt bitumen to form a homogeneous mixture before the rubber particles are gelatinized, and heating the mixture to 147° C. until the rubber dispersed in the mixture is vulcanized.

2. In the manufacture of asphalt compositions containing rubber uniformly dispersed therein, the method which comprises dispersing a finely divided, spray-dried, rubber latex composition in an oil which is readily miscible with asphalt but having not more than a slow solvent action on the finely divided rubber, and mixing the dispersion in a thinly fluid condition with fused asphalt to form a homogeneous mixture before the rubber particles are gelatinized.

JOHAN AART PLAIZIER.
JEAN GÉRARD FOL.